United States Patent [19]
Takagaki et al.

[11] Patent Number: 5,335,929
[45] Date of Patent: Aug. 9, 1994

[54] BICYCLE FRAME

[75] Inventors: Makoto Takagaki; Tadashi Karasawa; Kazumitu Futami, all of Chigasaki, Japan

[73] Assignee: Miyata Industry Co., Ltd., Chigasaki, Japan

[21] Appl. No.: 980,281

[22] Filed: Nov. 23, 1992

[30] Foreign Application Priority Data

Jun. 17, 1992 [JP] Japan ................. 4-048295

[51] Int. Cl.⁵ ............................ B62K 25/04
[52] U.S. Cl. ........................... 280/283; 280/284
[58] Field of Search .............. 280/275, 281.1, 283, 280/284; 180/227

[56] References Cited

U.S. PATENT DOCUMENTS

| | | |
|---|---|---|
| 944,795 | 12/1909 | Leet et al. ............ 280/284 |
| 3,907,332 | 9/1975 | Richardson . |
| 3,931,990 | 1/1976 | Knapp . |
| 4,356,877 | 11/1982 | Kamiya ............ 280/284 X |
| 4,421,337 | 12/1983 | Pratt . |
| 4,440,413 | 4/1984 | Miyakoshi et al. . |
| 4,505,492 | 3/1985 | Tsunoda . |
| 4,511,013 | 4/1985 | Miyakoshi et al. . |
| 4,515,236 | 5/1985 | Kanamori . |
| 4,789,174 | 12/1988 | Lawwill . |
| 5,000,470 | 3/1991 | Kamler et al. . |

FOREIGN PATENT DOCUMENTS

| | | |
|---|---|---|
| 374431 | 4/1984 | Austria . |
| 0923237 | 7/1947 | France ................. 280/284 |
| 5522237 | 7/1953 | Japan . |
| 50-650 | 1/1975 | Japan . |
| 51-31437 | 3/1976 | Japan . |
| 52-75738 | 6/1977 | Japan . |
| 52-88858 | 7/1977 | Japan . |
| 52-37552 | 8/1977 | Japan . |
| 54-156352 | 10/1979 | Japan . |
| 57-140285 | 8/1982 | Japan . |
| 0104022 | 2/1917 | United Kingdom ......... 280/284 |
| 0110272 | 10/1917 | United Kingdom ......... 280/284 |

Primary Examiner—Margaret A. Focarino
Assistant Examiner—Victor E. Johnson
Attorney, Agent, or Firm—Armstrong, Westerman, Hattori, McLeland & Naughton

[57] ABSTRACT

A bicycle frame has a triangular frame structure formed by bracket, seat and head lugs linked together by a seat tube, an upper tube and a lower tube. A chain stay is pivotally connected at a front end to the bracket lug and has a rear end fixed to a rear axle support to which a lower end of a rear fork member is pivotally connected. A triangular link is pivotally connected at a first point adjacent a first apex thereof to the seat lug and also pivotally connected at a second point adjacent a second apex to the upper end of the rear fork member. The triangular link is further pivotally connected at a third point ajacent a third apex to a free end of a cylinder rod of a shock absorbing assembly having a cylinder pivotally connected to the upper tube of the triangular frame structure, whereby the shock absorbing cylinder assembly is operative not only to absorb a shock on the rear-wheel but also to provide a "progressive effect" to enhance running performance and suspension and assure a frame rigidity.

5 Claims, 3 Drawing Sheets

BICYCLE FRAME

BACKGROUND OF THE INVENTION

1. Field of the Invention

The present invention relates to an improvement in a bicycle frame and, more particularly, to a bicycle frame which can absorb shocks during running to provide a more comfortable ride and which exhibits improved durability and running performance, thus attaining improved safety of ride.

2. Description of the Prior Art

A bicycle has been designed in such a way that impact is eased by a front fork which is bent in response to any shock to absorb it. Because the provision of a suspension system has been considered to be incompatible with the basic requirements for making a bicycle lighter and more rigid, the suspension system has not been employed so far. Recently, however, the bicycle materials have been made lighter and, in addition, more comfortable ride is greatly demanded. According to the remarkable popularity of mountain bicycles (MTB), moreover, various kinds of bicycle races have become popular, including offroad and downhill rides. Thus, to absorb shock caused by rough roads is greatly demanded.

Recently, researches have been carried out on bicycles in which shocks are absorbed by the front fork or by a frame head portion incorporating a reinforced urethane resin therein, as well as by a suspension provided in the saddle.

Nevertheless, a defect of these various suspensions is that they only absorb shocks to which the front wheel or the saddle portion is subjected, so that the shock absorption has been undesirably limited. The shock absorption capability of bicycles on the rear wheel side is the most important factor in the view points of performance and comfort of ride. There have been no bicycles which possess such a capability and a high rigidity. The conventional bicycles have been greatly improper particularly in respect of the absorption of shocks on both front and rear wheel sides during offroad rides.

SUMMARY OF THE INVENTION

The present invention provides an improvement in a bicycle frame of the type that has a bracket lug, a seat lug and a head lug, the bracket, seat and head lugs being linked together by a seat tube, an upper tube and a lower tube to form a substantially triangular frame structure. The improvement according to the present invention comprises a chain stay disposed rearwardly of the triangular frame structure and pivotally connected at an end to the bracket lug; a substantially triangular link having a first apex formed between its long and short sides, a second apex formed between the long side and a medium side and a third apex formed between the medium and short sides, the link being pivotally connected at a point adjacent the first apex to the seat lug such that the long side is directed toward the head lug; a shock absorbing cylinder assembly including a cylinder connected at an end to the upper tube and a cylinder rod normally urged to project outwardly from the cylinder and having a free end pivotally connected to the triangular link at a third point adjacent the third apex; and a rear fork member extending between and pivotally connected to the triangular link adjacent the second apex and the chain stay adjacent a rear axle support thereof.

As pointed out above, in the bicycle frame according to the present invention, the triangular link having long, medium and short sides is pivotally connected at its first point to the seat lug such that the long side is directed toward the head lug. The triangular link is also pivotally connected at its second point to an end of the rear fork member with the other end thereof pivotally connected to the chain stay adjacent the rear axle support thereof. The triangular link is further pivotally connected at the third point to the free end of the cylinder rod of the shock absorbing cylinder assembly with the cylinder thereof connected to the upper tube of the triangular frame structure of the bicycle frame. Accordingly, when the rear wheel is subjected to a shock, the chain stay is swung about the pivot point on the bracket lug so that the rear axle support is raised.

Accordingly, the rear fork member follows the upward movement of the rear axle support to urge the second point of the triangular link toward the shock absorbing cylinder assembly, so that the triangular link is rotated about the pivot point on the seat lug against the force of the shock absorbing cylinder assembly to allow the second point of the triangular link to be moved toward the shock absorbing cylinder assembly. When the angle between the rear fork member and a line interconnecting the pivot point of a triangular link on the seat lug and the second point on the triangular link is increased beyond 90 degrees, the angle of rotation of the triangular link caused by the movement of the rear fork member is increased to increase the displacement of the cylinder rod of the shock absorbing cylinder assembly. This will mean that the axle load relative to the travel of the rear axle is changed non-linearly to provide a so-called "progressive effect", whereby sufficient suspension and high rigidity are maintained and a comfortable ride is provided without power loss.

The above and other objects, features and advantages of the present invention will be made more apparent by the following description with reference to the accompanying drawings.

DESCRIPTION OF THE PREFERRED EMBODIMENT

Figure 1:
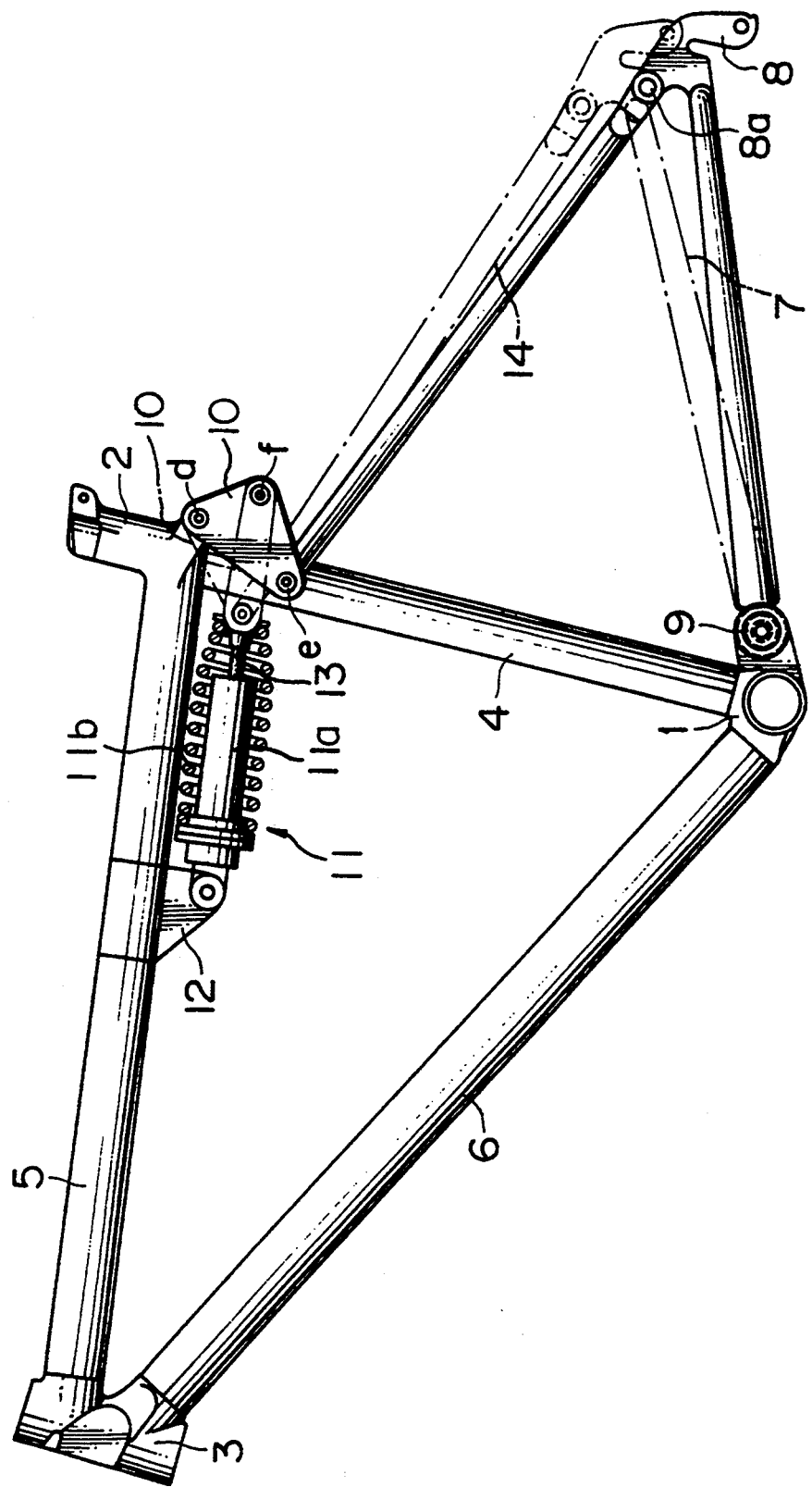
FIG. 1 is a side elevational view of an embodiment of a bicycle frame of the invention.
Figure 2:
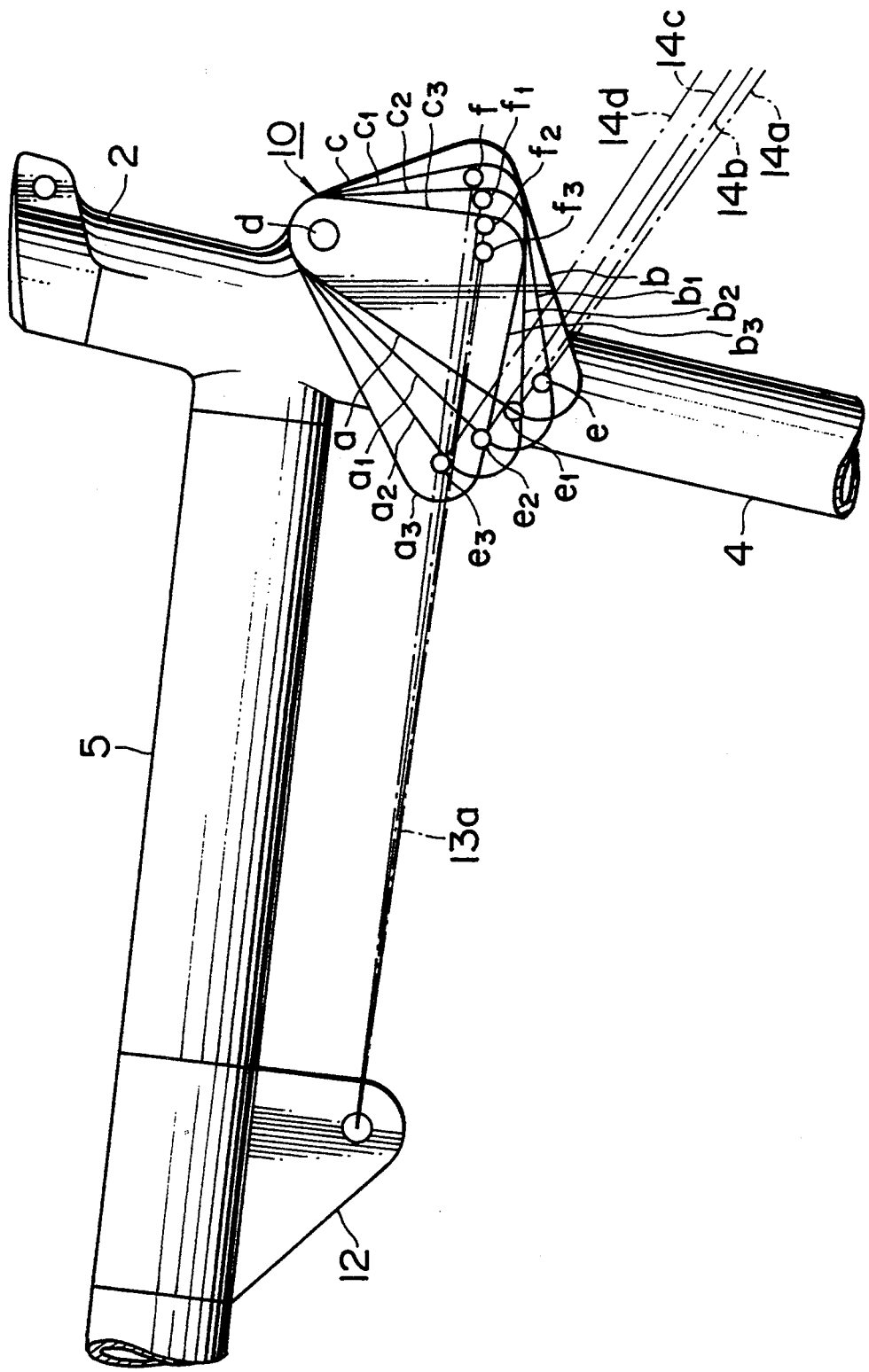
FIG. 2 is an enlarged fragmentary elevational view of the frame, illustrating the locus of movement of a triangular link.

A preferred embodiment will be described hereinunder with reference to the drawings. Referring to the drawings, a bicycle frame embodying the present invention includes a bracket lug 1, a seat lug 2, a head lug 3, a chain stay 7, a triangular link 10, a shock absorber cylinder assembly 11, and a rear fork member 14. The bracket lug 1, the seat lug 2 and the head lug are linked by a seat tube 4, an upper tube 5 and a lower tube 6 to form a triangular structure. The chain stay 7 and the rear fork member to be described later are connected to the triangular structure to complete a bicycle frame.

The chain stay 7 is pivotally connected at one end to the bracket lug 1 by means of a pin 9 and integrally connected at the other end to a rear axle support (rear fork end) 8. The rear axle support 8 is pivotally connected to the rear fork member 14 by means of a pin 8a. The triangular link 10 comprises a triangular plate member having a long side a, a medium side b and a short side c. The long side a and the short side c form therebetween a first apex d. Likewise, a second apex e and a third apex f are respectively formed between the long side a and the medium side b and between the medium side b and the short side c. The triangular link 10 is pivotally connected at the first apex d to the seat lug 2 such that the long side a is directed to the shock absorber cylinder assembly 11, i.e., to the head lug 3.

The shock absorber cylinder assembly 11 includes a hydraulic cylinder 11a which is pivotally connected at one end to the upper tube 5 by means of a mounting bracket 12 and a cylinder rod 13 which is urged outward to project from cylinder 11a. The outer end of the cylinder rod 13 is pivotally connected to the third apex f of the triangular link 10. A compression coil spring 11b is disposed around the cylinder 11a and the cylinder rod 13 and extends between the triangular link 10 and a flange on the cylinder 11a. The upper end of the rear fork member 14 is pivotally connected to the second apex e of the triangular link 10 so that the chain stay 7 swings counterclockwise as indicated by broken lines in FIG. 1 when a rear wheel is subjected to a shock. Consequently, the second apex e of the triangular link 10 rotates clockwise about the first apex d and, simultaneously, the cylinder rod 13 connected to the third apex f is forced back into the shock absorber cylinder assembly 11 against the outward urging force thereof, whereby the shock is absorbed.

A description will now be made of a pressing torque which acts on the cylinder rod 13. When the rear wheel is subjected to a shock, the chain stay 7 rotates counterclockwise about the pin 9 of the bracket lug 1 in accordance with a movement of the rear axle support 8 to a position shown by broken lines in FIG. 1, allowing the rear axle support 8 to be lifted upwards. Accordingly, the rear fork member 14 urges the second apex e of the triangular link 10 towards the shock absorber cylinder assembly 11 to rotate the triangular link 10 such that the second apex e of the triangular link 10 is moved from the position e through positions e1 and e2 to a position e3 towards the shock absorber cylinder assembly 11 around the supporting part (the first apex d) of the seat lug 2, against the pressing force exerted to the triangular member 10 by the cylinder rod 13 and the spring 11b.

In correspondence with the movement of the second apex e, the long side a moves as a1-a2-a3, the medium side b as b1-b2-b3, and the short side c as c1-c2-c3. The third apex f consequently moves progressively as f1-f2-f3, to thereby press the cylinder rod 13 along its longitudinal axis 13a. Therefore the shock absorber cylinder assembly 11 is progressively compressed.

Figure 3:
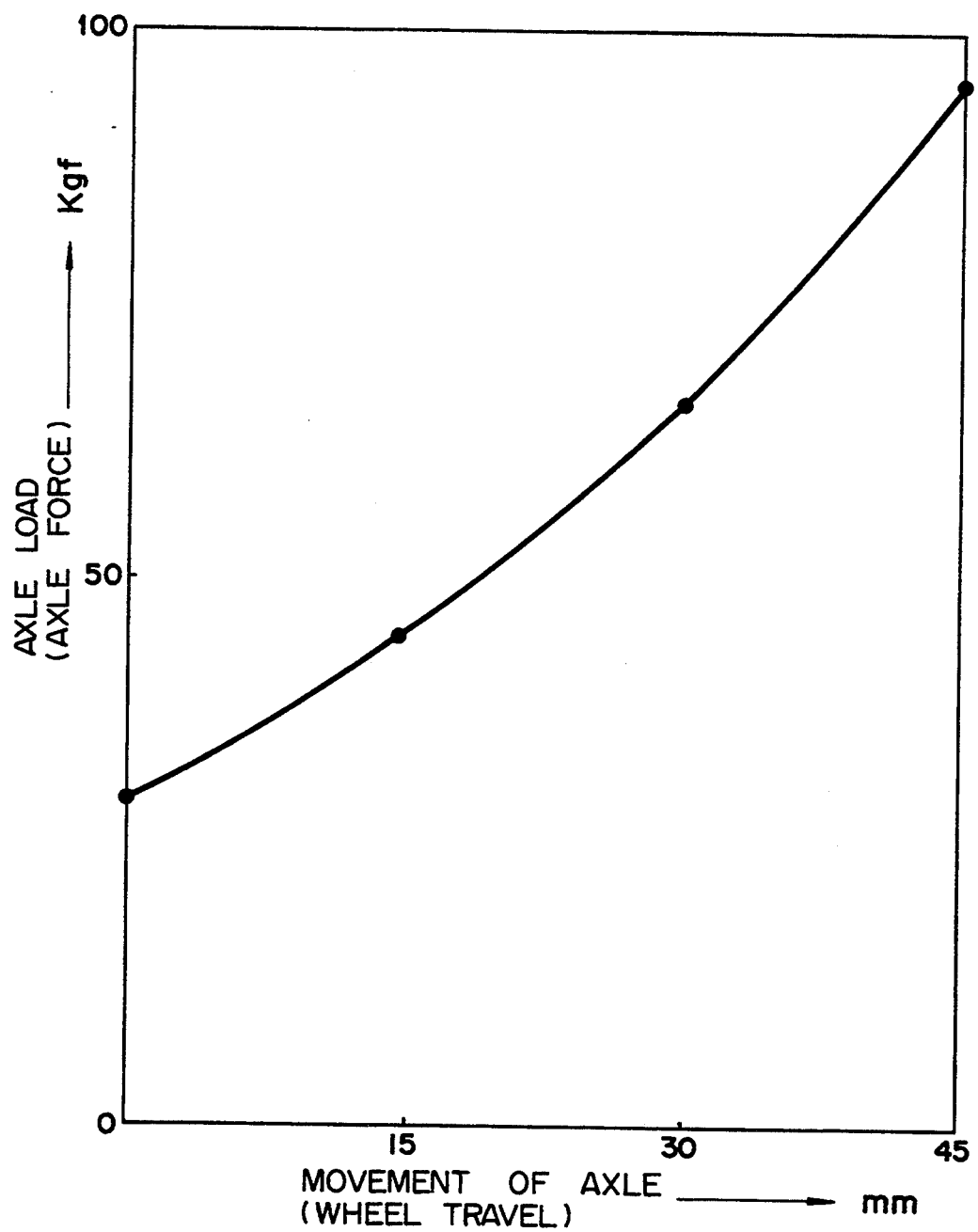
FIG. 3 is a graph showing the relationship between the upward movement of the rear axle bearing (wheel travel) and the reaction force (axle force) directed downward from the rear axle support.

At this moment, a substantially right angle is formed between the line interconnecting the second apex e and the supporting point (the first apex d) of the seat lug and the longitudinal axis of the rear fork member 14, as shown by solid lines in FIG. 1. Beyond this time point, the angle of rotation of the triangular link 10 caused by the rear fork member 14 becomes greater, so that the movement of the cylinder rod increases consequently. Further, the upward movement of the chain stay 7 is controlled due to "progressive effect" as shown in the curve of the graph shown in FIG. 3 indicating the relation between the upward movement of the rear axle support 8 (wheel travel) and the reaction force (Axle-Force) directed downward from the rear axle support 8. Thus, suspension and rigidity are sufficiently maintained to provide a comfortable ride without power loss.

As will be understood from the foregoing description, the present invention provides a bicycle frame comprising a bracket lug, a seat lug and a head lug linked by a seat tube, an upper tube and a lower tube to form a triangular frame structure, wherein a chain stay is provided rearwardly of the frame structure and pivotally connected at its one end to the bracket lug, a triangular link having a first apex formed between long and short sides, a second apex formed between the long side and a medium side and a third apex formed between the medium and short sides, the triangular link being pivotally connected at the first apex to the seat lug with the long side directed toward the head lug, a shock absorbing cylinder assembly has an end supported by the upper tube and includes a cylinder rod normally urged to project outward, the triangular link being pivotally connected at the third apex to a free end of the cylinder rod; and a rear fork member is provided between the second apex of the triangular link and a portion of the chain stay adjacent a rear axle support. Consequently, the present invention offers the following advantages.

When the rear wheel is subjected to a shock during running, the chain stay swings about the supporting part of the bracket lug, allowing the rear axle support to be raised upward. Correspondingly, the rear fork member urges the second apex of the triangular link towards the shock absorber cylinder assembly, so that the triangular link is rotated about the support part of the seat lug to causes the third apex to move towards the shock absorber cylinder assembly against the urging force exerted to the cylinder rod. The angle of rotation of the triangular link caused by the rear fork member is increased when the angle formed between the rear fork member and a line interconnecting the first and second apices d and e of the triangular link has been increased beyond 90°. The movement or displacement of the cylinder rod is therefore increased to produce an effect known as "progressive effect", to advantageously control upward displacement of the chain stay, whereby sufficient suspension and high rigidity are maintained to provide comfortable ride without power loss.

By virtue of the use of the triangular link, the rear wheel load is efficiently widely distributed. Furthermore, because the triangular link is pivoted to a portion of the frame adjacent the point where the seat tube and the upper tube are connected together, i.e., to the seat lug, the present invention is also capable of ensuring sufficient transverse rigidity for a bicycle frame which usually lacks transverse stability.

What is claimed is:
1. A bicycle frame comprising:
a substantially triangular frame structure formed by a bracket lug, a seat lug, a head lug, a seat tube extending between and interconnecting said bracket and seat lugs, an upper tube extending between and interconnecting said seat and head lugs and a lower tube extending between and interconnecting said bracket and head lugs,
a chain stay disposed rearwardly of said triangular frame structure and having an end pivotally connected to said bracket lug;

a substantially triangular link having long, medium and short sides, said long and short sides cooperating to define therebetween a first apex, said long and medium sides cooperating to define therebetween a second apex, said medium and short sides cooperating to define therebetween a third apex, said triangular link being pivotally connected at a point thereof adjacent the first apex to said seat lug;

a shock absorbing cylinder assembly including a cylinder connected at an end thereof to said upper tube and a cylinder rod normally urged to project outwardly from said cylinder and having a free end pivotally connected to said triangular link adjacent said third apex; and a rear fork member extending between and pivotally connected to said triangular link adjacent said second apex and said chain stay adjacent a rear axle support thereof;

wherein when the chain stay pivots about said bracket lug in a counter clockwise direction, said triangular link pivots about said seat lug in a clockwise direction.

2. The bicycle frame according to claim 1, wherein said shock absorbing cylinder assembly further includes a compression coil spring disposed around said cylinder and said cylinder rod and extending between a flange on said cylinder and said triangular link.

3. A bicycle frame, comprising:

a seat tube, an upper tube and a lower tube connected together to form a substantially triangular frame structure, a bracket lug connecting said seat tube to said lower tube, a head lug connecting said lower tube to said upper tube, and a seat lug connecting said upper tube to said seat tube;

a chain stay disposed rearwardly of said triangular frame structure and pivotally connected at an end to said bracket lug;

a substantially triangular link having a long side, a medium side, and a short side and having a first apex formed between its long and short sides, a second apex formed between the long side and the medium side and a third apex formed between the medium and the short sides, and triangular link being pivotally connected at a first point adjacent the first apex to said seat lug such that said long side faces toward said head lug;

a shock absorbing cylinder assembly including a cylinder connected at a first end to said upper tube and a cylinder rod normally urged to project outwardly from said cylinder and having a free end pivotally connected to said triangular link at a third point adjacent said third apex; and a rear fork member pivotally connected to said triangular link at a second point adjacent said second apex at one end thereof and pivotally connected to said chain stay adjacent a rear axle support at another end thereof;

wherein when the chain stay pivots about said bracket lug in a counter clockwise direction, said triangular link pivots about said seat lug in a clockwise direction.

4. The bicycle frame according to claim 3, wherein said shock absorbing cylinder assembly further includes a compression coil spring disposed around said cylinder and said cylinder rod and extending toward said triangular link.

5. The bicycle frame according to claim 3, wherein an angle of about ninety degrees is initially formed between a line interconnecting said second point and said first point and a line along a longitudinal axis of the rear fork member.

* * * * *